United States Patent [19]
Cruz et al.

[11] Patent Number: 5,613,032
[45] Date of Patent: Mar. 18, 1997

[54] SYSTEM AND METHOD FOR RECORDING, PLAYING BACK AND SEARCHING MULTIMEDIA EVENTS WHEREIN VIDEO, AUDIO AND TEXT CAN BE SEARCHED AND RETRIEVED

[75] Inventors: Gil C. Cruz, Annandale; Steven L. Rohall, Somerville; Jonathan Rosenberg, Annandale; Lanny S. Smoot, Morris Township, all of N.J.

[73] Assignee: Bell Communications Research, Inc., Morristown, N.J.

[21] Appl. No.: 300,824

[22] Filed: Sep. 2, 1994

[51] Int. Cl.$^6$ .......................... H04N 5/91; H04N 5/926; H04N 7/52
[52] U.S. Cl. .......................... 386/69; 386/112; 386/124; 360/72.1; 370/487
[58] Field of Search .......................... 348/7, 13; 358/108, 358/342; 370/73; 381/43; 360/72.1, 72.3; 369/32; 386/69, 70, 111, 112, 124

[56] References Cited

U.S. PATENT DOCUMENTS

| | | | |
|---|---|---|---|
| 4,630,110 | 12/1986 | Cotton et al. | 358/108 |
| 5,045,940 | 9/1991 | Peters et al. | 358/143 |
| 5,130,792 | 7/1992 | Tindell et al. | 358/85 |
| 5,251,909 | 10/1993 | Reed et al. | 273/439 |
| 5,262,875 | 11/1993 | Mincer et al. | 358/335 |
| 5,359,601 | 10/1994 | Wasilewski et al. | 370/73 |
| 5,371,532 | 12/1994 | Gelman et al. | 348/7 |
| 5,414,455 | 5/1995 | Hooper et al. | 348/7 |
| 5,442,390 | 8/1995 | Hooper et al. | 348/7 |
| 5,491,511 | 2/1996 | Odle | 348/153 |

OTHER PUBLICATIONS

Davies, The digital television tape recorder–audio and data recording aspects, SMPTE, pp. 4–12.
Gil Cruz et al., Capturing and Playing Multimedia Events with Streams, procedings, ACM Multimedia 1994, San Francisco, Ca.
Matthew Lennig, Putting Speech Recognition to work In the Telephone Network, Aug. 1990, pp. 35–40.
Steve Whittaker et al. "Filotchat: Handwritten Notes Provide Access to Recorded Conversations," *Proceedings of the Human Factors,* Apr. 1994, Boston, Massachusetts, pp. 271–277.

*Primary Examiner*—Tommy P. Chin
*Assistant Examiner*—David R. Vincent
*Attorney, Agent, or Firm*—Loria B. Yeadon; James W. Falk

[57] ABSTRACT

A system for recording and playing back multimedia events includes recording sources, a preprocessor, a delivery processor, and user control units. The recording sources each captures a continuous temporal record or track of the multimedia event and transmits the captured track to the source preprocessor where tracks are coded into digital blocks and digitized blocks of tracks received simultaneously are time stamped with the same relative time, and therefore synchronized in time. Tracks of the multimedia event are also compressed and preprocessed to generate other representations of the multimedia event, which further assist users in searching through the multimedia event. The delivery processor services users' requests for multimedia events and delivers events to requesting users according to users' interactive commands. The delivery processor also generates stacked representations of the tracks of the multimedia event, which representations provide visual cues to assist the user in conducting rapid and intelligent searches through the multimedia event. The user control unit receives requests and interactive commands from the user to be transmitted to the delivery processor and multimedia events from the delivery processor for presentation to the user. Our inventive method for recording and playing back multimedia events entails: capturing tracks of various aspects of a multimedia event; coding the tracks into digitized blocks; time stamping each block; and compressing and preprocessing each track as instructed in a source mapping table; transmitting tracks of the multimedia event to the user as requested; and adjusting the delivery of tracks based upon relative time information associated with a new position established after searching through a track of the multimedia event.

22 Claims, 15 Drawing Sheets

FIG. 3B

TRACK MAPPING TABLE

| TRACK # | RECORDING SOURCE DESCRIPTION | INFORMATION TYPE | DIGITIZATION INSTRUCTIONS | COMPRESSION/ DECOMPRESSION INSTRUCTIONS | PROCESSING INSTRUCTIONS |
|---|---|---|---|---|---|
| 1 | AUDIO CAPTURING SYSTEMS | AUDIO | ANALOG TO DIGITAL | ADPCM 4:1 | SPEAKER IDENTIFICATION |
| 2 | FIRST CAMERA LECTURER | VIDEO | ANALOG TO DIGITAL | MPEG 100:1 | INCREASE RESOLUTION |
| 3 | SECOND CAMERA TRAINEES | VIDEO | ANALOG TO DIGITAL | MPEG 100:1 | INCREASE RESOLUTION |
| 4 | THIRD CAMERA VIEW GRAPHS | VIDEO | ANALOG TO DIGITAL | M-JPEG 5:1 | CHARACTER RECOGNITION |
| 5 | ELECTRONIC WHITE BOARD | WRITTEN STROKES | NONE | NONE | CHARACTER RECOGNITION |

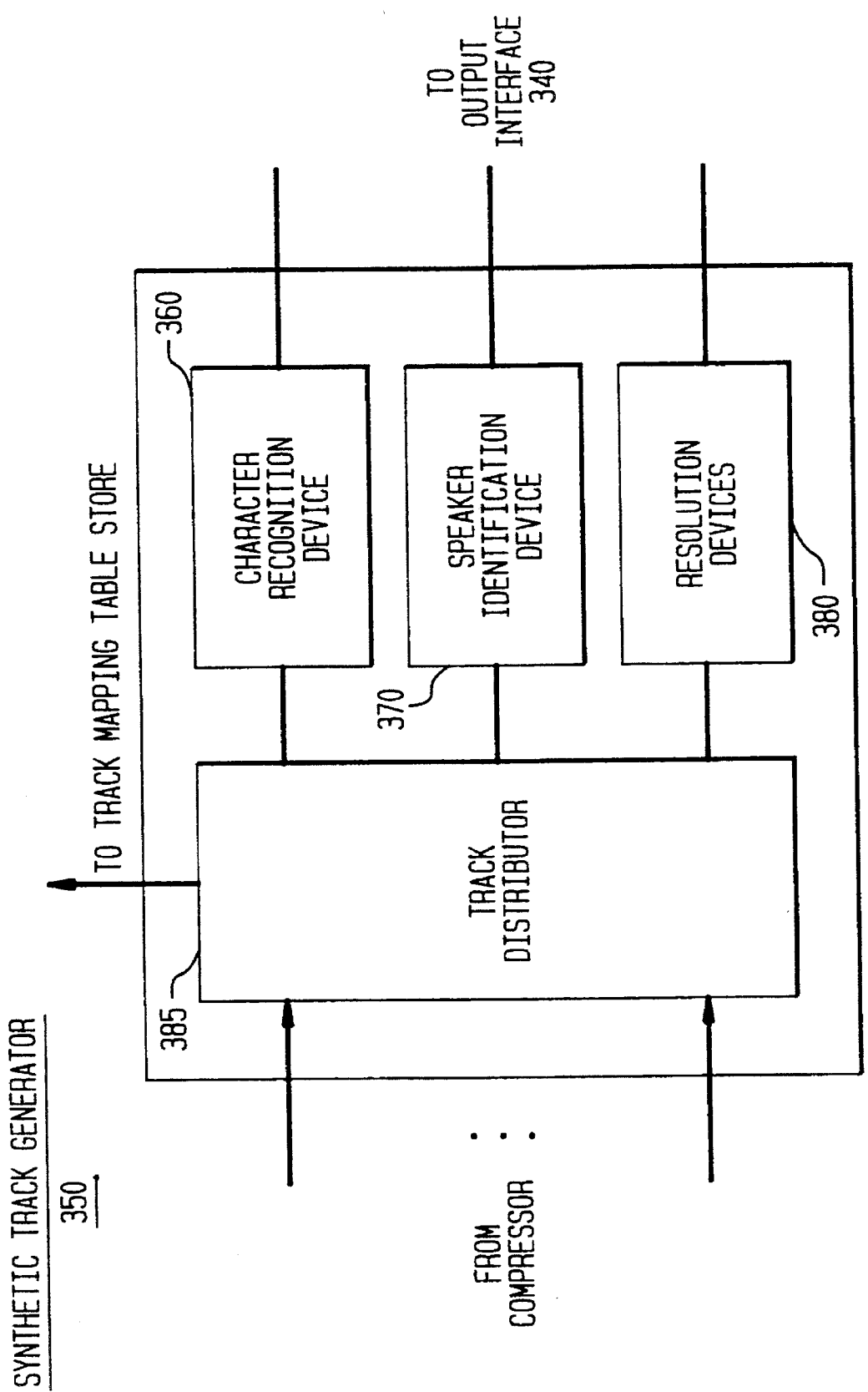

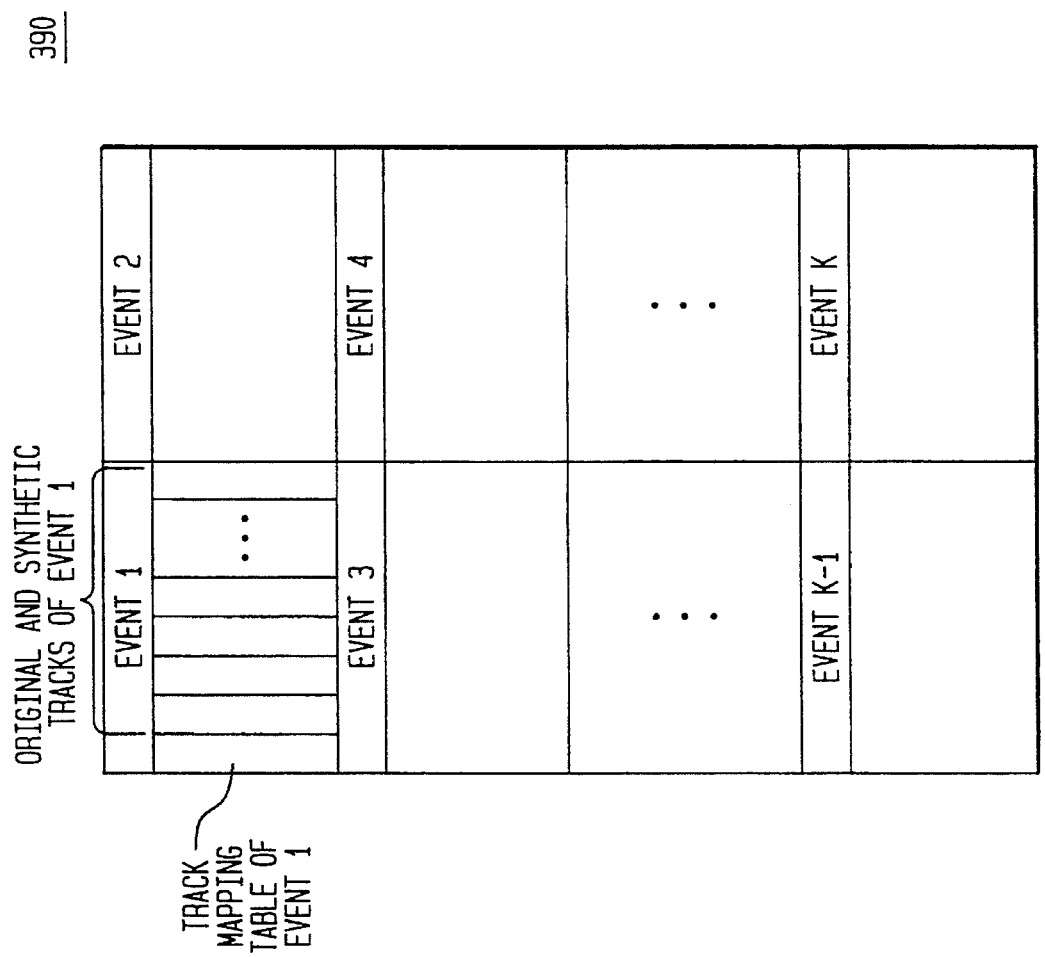

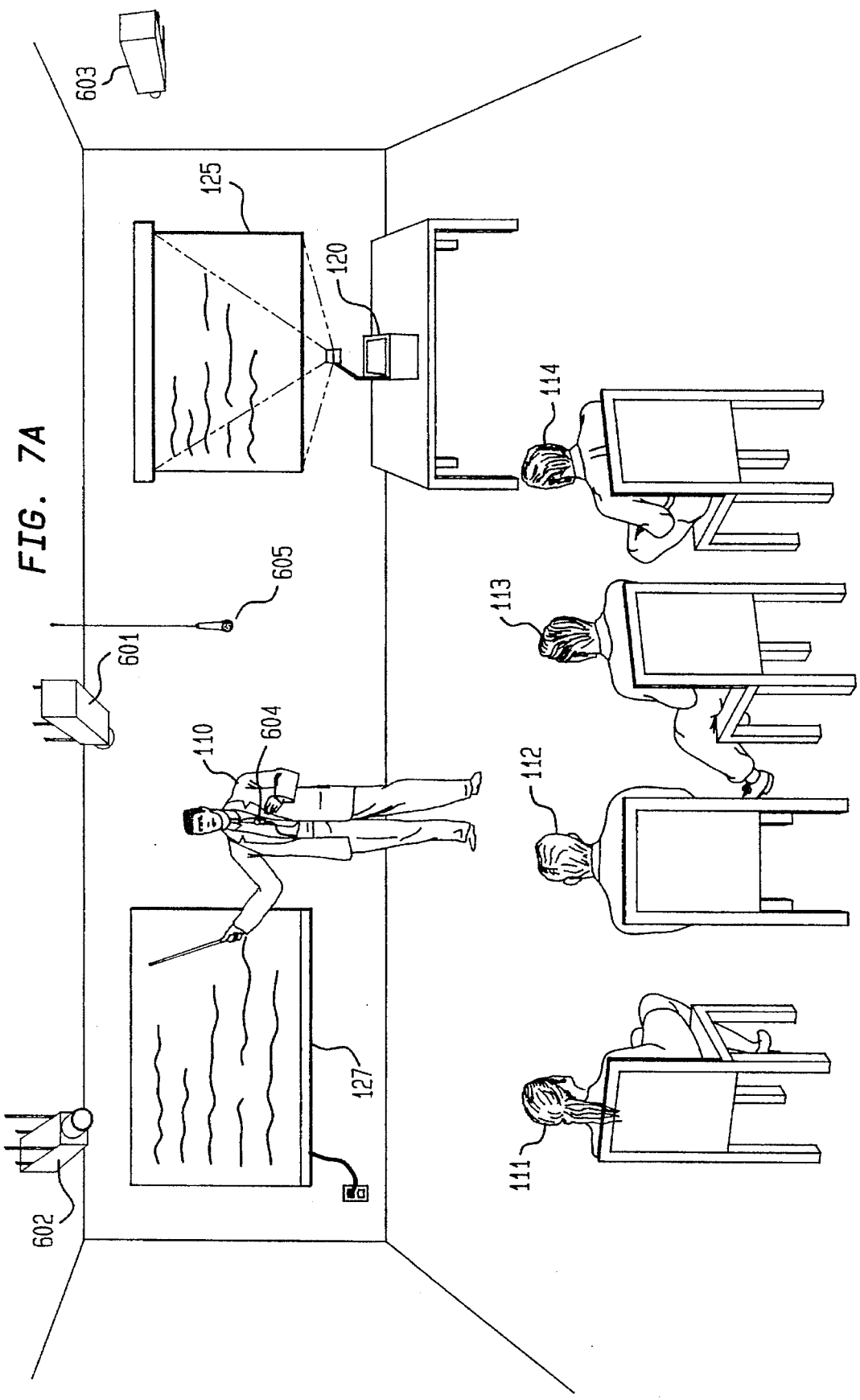

RECORDING AND PLAYBACK METHOD 800

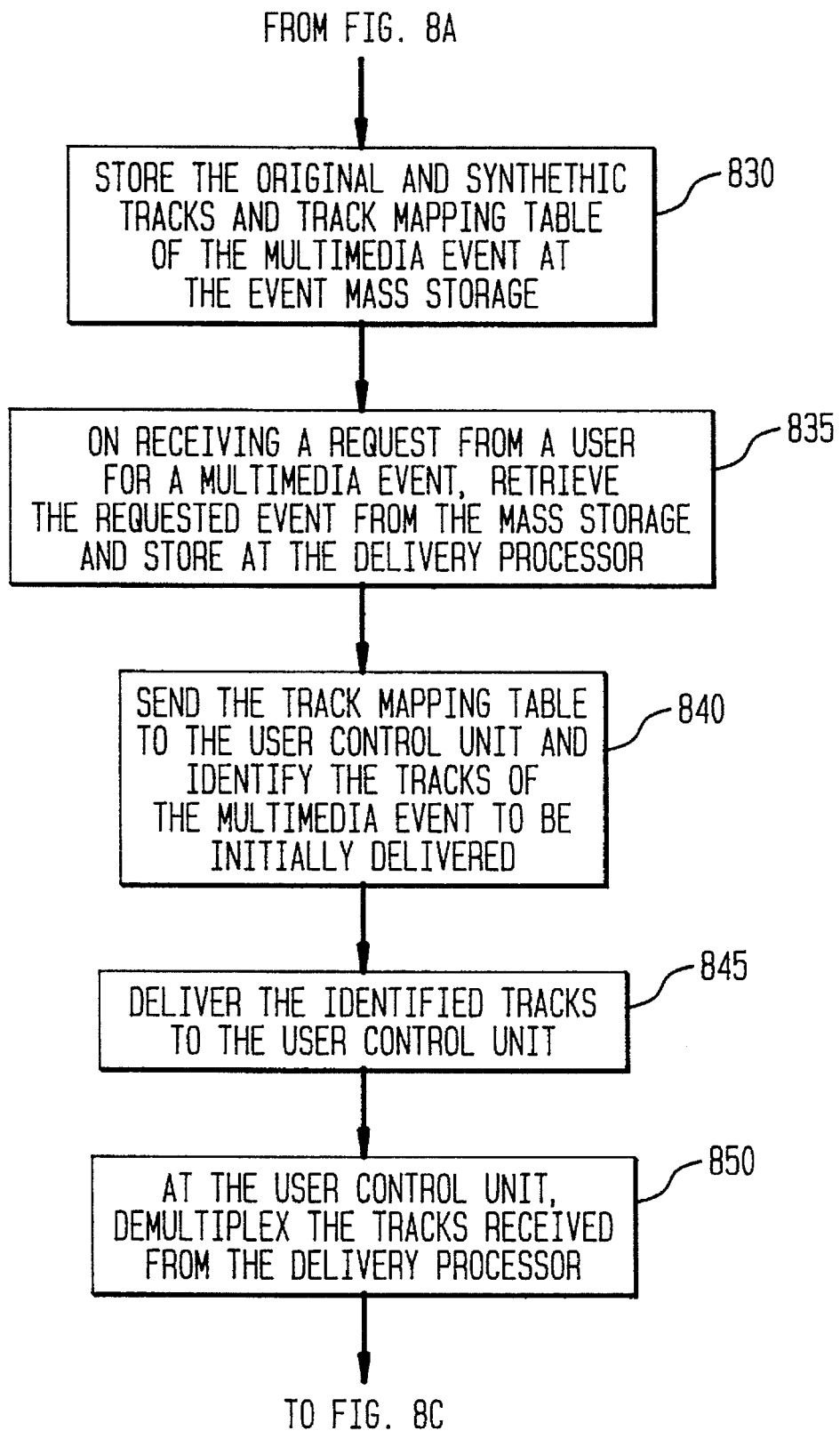

SYSTEM AND METHOD FOR RECORDING, PLAYING BACK AND SEARCHING MULTIMEDIA EVENTS WHEREIN VIDEO, AUDIO AND TEXT CAN BE SEARCHED AND RETRIEVED

RELATED APPLICATIONS

U.S. patent application Ser. No. 08/274,503, entitled *Apparatus and Method for Preprocessing Multimedia Presentations* and U.S. patent application Ser. No. 08/274,502, entitled *System and Method for Preprocessing and Delivering Multimedia Presentations,* both filed on Jul. 13, 1994, for the inventors G. C. Cruz, R. D. Hill, T. H. Judd, D. H. New, and J. Rosenberg, and assigned to the assignee hereof, contain subject matter related to that of the present application.

FIELD OF THE INVENTION

This invention relates to a system and method for recording and playing back multimedia events.

BACKGROUND OF THE INVENTION

A shared communications experience is an event at which groups of communicants engage in the exchange of information and ideas. Such events include business and technical presentations, training sessions, lectures, and meetings. A shared communications experience might also include a teleconferencing session between participants located remotely from one another. Where the event entails the exchange of different forms (e.g., video, text, and audio), the event is commonly characterized as a multimedia event. The exchange of information may be assisted by both non-electronic devices (e.g., view graphs, white boards, and notepads) and electronic devices (e.g., video, computers, and electronic white boards).

FIG. 1 depicts an example of a multimedia event and electronic and non-electronic devices that might be employed to facilitate communication. At the training session, there is a lecturer 110, who presents information to trainees 111–114 seated in the training room 100. To facilitate presentation of the information to the trainees, the lecturer utilizes a view graph machine 120, which projects an image on to a projection screen 125. The lecturer also utilizes an electronic white board 127 for drawing handwritten notes and diagrams.

Shared communications experiences, such as that shown in FIG. 1, are often recorded to allow persons unable to attend the event to benefit from the exchange of information and ideas. The recording also permits attendees to review the event and clarify details that were missed during the live event. A technique for recording such events may include using written notes, such as those that might be taken by one of the trainees 111–114 at the training session. Written notes result in a subjective interpretation of the event that may lack important visual information, such as the speaker's body language and trainees' non-verbal responses to lecture materials as well as audible information such as the speaker's tone of voice. Another drawback is that the written notes are also a subjective interpretation of the event by the scrivener.

Another technique involves recording the audio of the event on audio cassettes. Pure audio recordings can be a more accurate and complete record of the experience than written notes, but are difficult to browse or search. Therefore, if a user of the recording were only interested in hearing a portion of the event where the lecturer 110 answered a question asked by trainee 111, the listener must randomly advance and reverse in the audio recording until stumbling upon the desired segment. As with written notes, visual cues from the event are lost.

A commonly preferred technique for recording events is using a video camcorder operated by human operator. A video recording provides the most accurate representation of the event, but often does not provide adequate coverage of the whole experience because of the limited field of view of conventional video camcorders. Furthermore, the view of the event captured in the video recording has been subjectively selected by the human operator, and this view may not coincide with the view of the event desired by a user of the video recording. For example, the camera operator may focus on the view graphs projected onto the projection screen 125 while the lecturer 110 is emphasizing a point and miss the gestures of the lecturer 110 used to illustrate the point. Consequently, users of the recording will never see these gestures. Optimally, both the view graphs and the lecturer should be captured such that users of the recording have the option to choose which view should be presented. But, under conventional single camera recording systems, users of the video recording are limited to the view subjectively selected by the camera operator.

Alternatively, the video recording can be generated using a more sophisticated technique employing multiple cameras and other equipment as described in Braun et al U.S. Pat. No. 5,187,571, Feb. 16, 1993, which cameras and equipment facilitate the capturing and contiguous merging of multiple views of an event to form an aggregate field view. Under this approach, cameras 130, 140, and 150 could be used to capture Regions A, B, and C, respectively, of the training session as shown in FIG. 1. This approach provides a more faithful reproduction of the entire event than any approach previously mentioned, but production of the recording can be cost-prohibitive and the quality of the recording is limited by the resolution of the medium on which the recording is stored. By capturing a full view of the event, the resolution of any aspect of the event is significantly diminished. For example, by recording a full view of the lecture session comprising the fields of view of cameras 130, 140, and 150, the notation on the white board 127 and the text on the view graphs projected on screen 125 may be illegible. This is because video is a relatively poor medium for recording certain information, such as text written on a white board and in view graphs projected on a screen.

Even with sophisticated recording techniques, the video recording may be of little benefit to a user in browsing, reviewing, or analyzing the event. Many of the limitations are a result of the analog medium used for storing the recording. Analog recordings are used because of the low costs and wide availability of equipment and storage media such as Video Home System (VHS) video tapes. Technology such as the Society of Motion Picture and Television Engineers (SMPTE) time code, which facilitates indexing video tape, computer-controlled videodisc players, and video cassette recorders (VCRs) may overcome some of the limitations, but others remain. In particular, due to its lack of structure and slow access, analog video tape is difficult to browse to identify quickly points of interest. Similar to the audio recording, locating a point of interest requires that the user randomly advance and reverse in the video recording until stumbling upon the point of interest. Furthermore, once the point of interest has been located, the viewer has limited flexibility, if any, to control the resolution of an aspect of the recording or to disable an unwanted aspect of the recording.

For example, under conventional approaches, a viewer would not have the flexibility of increasing the resolution of the audio portion of a recording to increase the audible clarity of a question from trainee 111 to the lecturer 110, or totally disabling the view from camera 140 of Region B.

Another consideration when selecting a mechanism for recording an event is the method of delivering the recorded event to the user. One delivery alternative is to transmit the recording from a service provider to a user over a network in real time. However, a limitation of conventional video recordings is that such recordings are bandwidth intensive and often exceed the bandwidth capabilities of the network and the user's facilities, thereby precluding this alternative as a method of delivering recordings to users.

In view of these drawbacks and shortcomings of conventional approaches to recording shared communication experiences including multimedia events, our objective is a system and method for recording and playing back an event such that a user of the recording can control the aspects of the event being presented. A further objective is to facilitate browsing and searching through a recording to locate a point of interest in the recorded event. Another objective is to record events such that the aspects of the event delivered to the user can be adapted to meet constraints of the network, such as bandwidth limitations, and the user's equipment.

SUMMARY OF THE INVENTION

Aspects of our invention are a system and method for recording and playing back multimedia events, such as business and technical presentations, training sessions, lectures, and meetings. Our inventive system includes recording sources, a preprocessor, event mass storage, a delivery processor, a distribution network, and user control units. The recording sources are devices, such as audio recorders and video camcorders, each of which captures an aspect of the multimedia event, which aspect is referred to herein as a multimedia track or a continuous media temporal record. The recording source transmits the track or record to the preprocessor where each track is received, coded into digital blocks, if necessary, and time stamped. Digitized blocks of tracks that are simultaneously received at the preprocessor are assigned the same relative time and therefore synchronized in time. At the preprocessor, some tracks of the multimedia event are also compressed to reduce the bandwidth required for transmitting a multimedia event to a user. The digitization and compression techniques employed for each track are dictated by entries in a track or record mapping table, which entries are based on the type of information carried by the track. For example, tracks carrying predominately textual information may be digitized and compressed differently than tracks carrying full motion video. In addition, the original records or tracks of the multimedia event may be preprocessed to generate other representations of the multimedia event, known derivative continuous temporal records or tracks, which further assist users in searching through the multimedia event.

Our inventive system also includes an event mass storage where recordings of multiple multimedia events are stored for delivery to requesting users. At the event mass storage, the tracks of a multimedia event, which tracks each represents different aspects of the event, are maintained as separate and distinct tracks. Another component of our inventive system is the delivery processor which services requests for multimedia events from multiple users, retrieves requested events from the event mass storage, and delivers events to requesting users according to the users' interactive commands. The delivery processor is connected via the distribution network to multiple user control units, where requests and interactive commands from the user are received and multimedia events from the delivery processor are received for presentation to the user. The delivery processor may also identify the aspects of the event to be delivered to a user control unit based upon the bandwidth limitations of the distribution network and the capabilities of the user equipment. The delivery processor also generates stacked representations of the tracks of the multimedia event, which representations provide visual cues to assist the user in conducting intelligent searches through the multimedia event and in locating points of interest.

The user control unit is connected to user output devices, which convert the tracks of the multimedia event received from the delivery processor into a form suitable for the user. The user control unit is also connected to user input devices, where users input requests and interactive commands.

Our inventive method for recording and playing back multimedia events entails capturing various aspects of a multimedia event, such as a training session, using multiple recording sources. The tracks or records generated by the recording sources are received at the preprocessor, where the tracks are coded into digitized blocks, time stamped, compressed, preprocessed, and transferred to and stored at the event mass storage. On a request for a multimedia event being received from a user, the delivery processor responds by retrieving the requested multimedia event from mass storage and delivering the tracks of the event, which tracks represent aspects of the event, to the user control unit. If only certain aspects of the multimedia event were requested by the user or if the distribution network or user output devices are not capable of supporting all aspects of the event, the delivery processor will cause those aspects that are requested and capable of being received to be delivered. The tracks are then presented by the user control unit at the user output devices. By interacting with user input devices, the user can search through any of the individual tracks of the multimedia events to locate a point of interest in the multimedia event and can control the presentation of the tracks at the user output devices using traditional VCR-type commands, as well as other play back features.

BRIEF DESCRIPTION OF THE DRAWING

FIG. 3B depicts a track mapping table, which provides instructions for digitizing, compressing, and preprocessing tracks of the multimedia event in accordance with an aspect of our invention.

FIG. 3C depicts a derivative track generator of the preprocessor in accordance with an aspect of our invention.

FIG. 4 illustrates the arrangement of multimedia events in mass storage in accordance with an aspect of our invention.

FIG. 7A depicts an illustrative example of a training session, wherein recording sources capture multimedia tracks of various aspects of the session, in accordance with our invention.

FIGS. 8A, 8B, and 8C depict an illustrative flow diagram of our recording and play back method, in accordance with our invention.

The organization and operation of the invention will be better understood from a consideration of the detailed description of the illustrative embodiments thereof, which follow, when taken in conjunction with the accompanying drawing.

DETAILED DESCRIPTION OF THE INVENTION

Multimedia is a combination of different types of information (e.g., still images, text, graphics, audio, and motion video) integrated into a single presentation. Multimedia events include business and technical presentations, training sessions, lectures, and meetings, comprising such integrated combinations of different forms of information. Our invention is a system and method for recording and playing back multimedia events such that a user of the recorded multimedia event can review a desired aspect of the event and maximally benefit from the exchange of information that took place at the live event. Our system also permits a user to intelligently search through the recorded event and control the play back of the recorded event in a manner conducive to the information needs of the user and within the limitations of the user's facilities.

Figure 1:
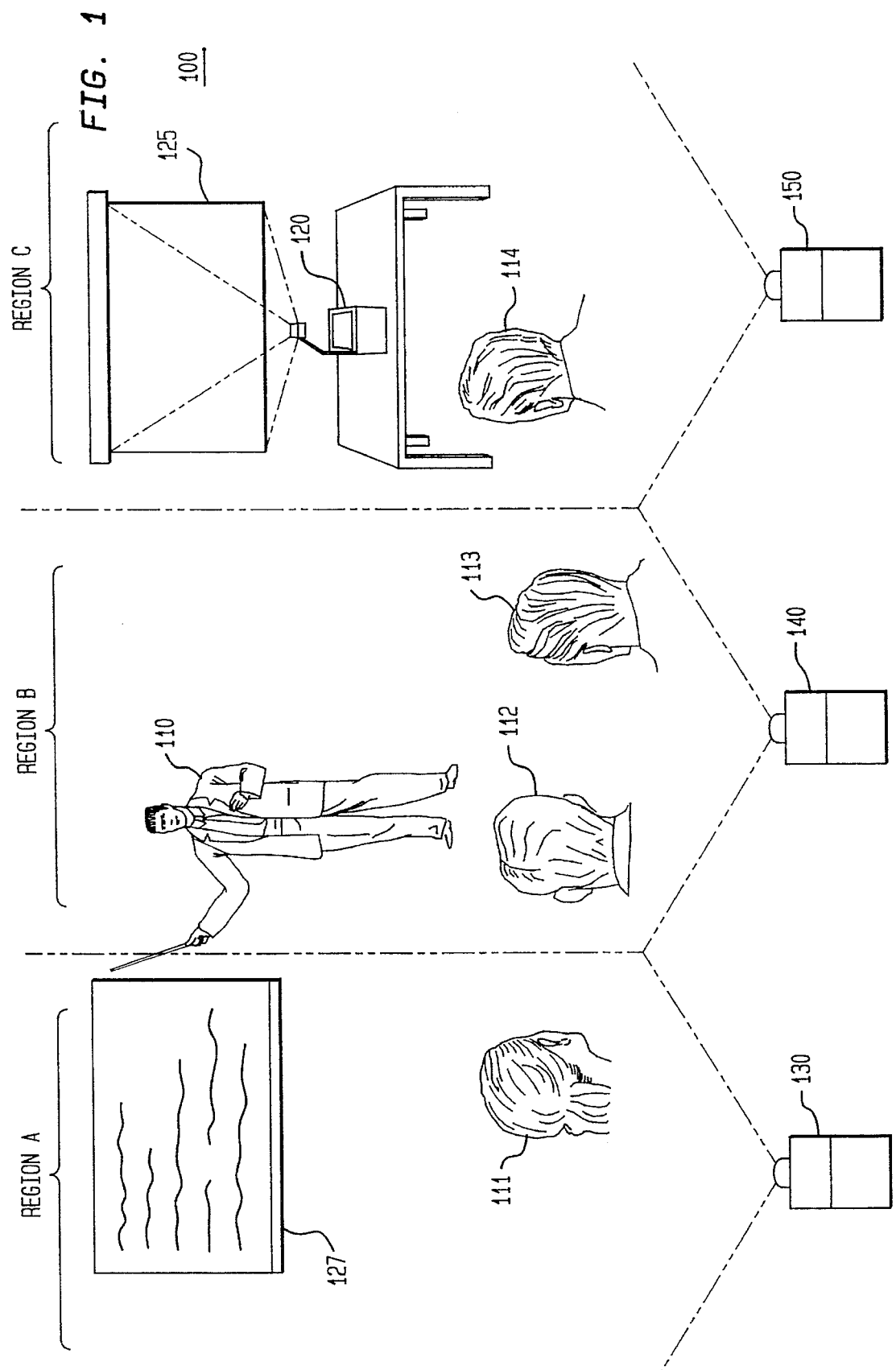
FIG. 1 depicts an illustrative example of a training session.
Figure 2:
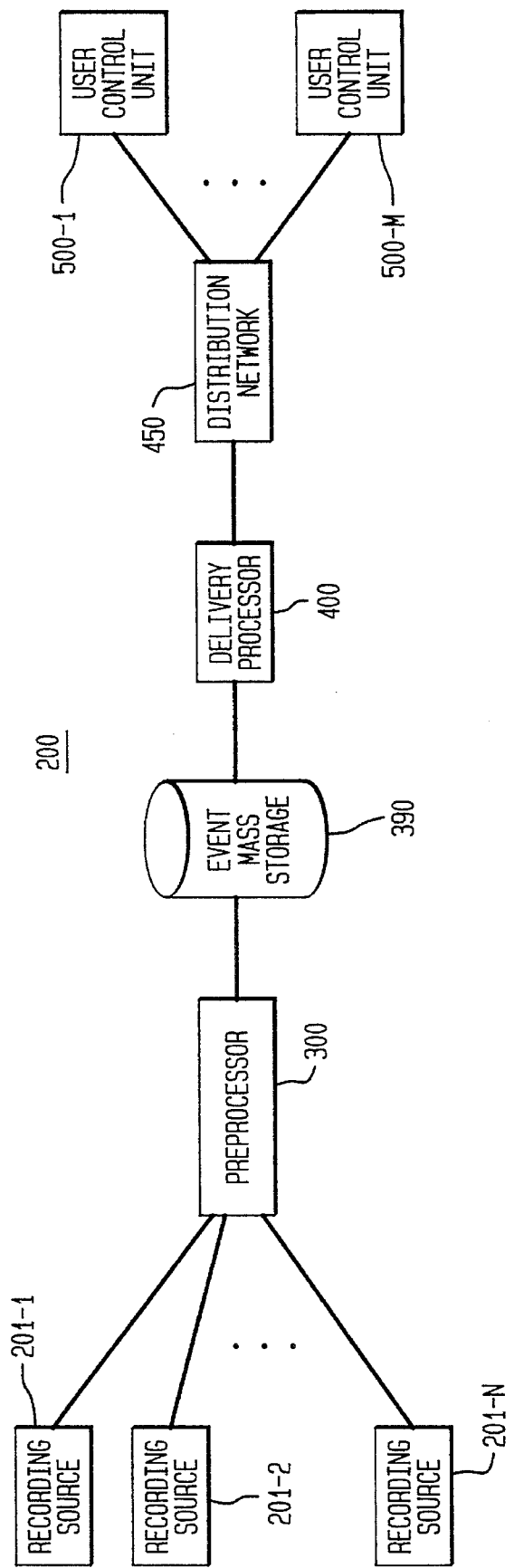
FIG. 2 depicts an illustrative embodiment of a system for recording and playing back multimedia events in accordance with our invention.

A specific illustrative embodiment of our inventive system 200 is depicted in FIG. 2 and comprises recording sources 201-1 through 201-N, a preprocessor 300, an event mass storage 390, a delivery processor 400, a distribution network 450, and user control units 500-1 through 500-M. The recording sources 201 are devices that each capture and transmit a different portion of a multimedia event and convert what it captures to electronic signals, referred to herein as a track or a continuous temporal record. Such devices include audio recorders and camcorders. Recording sources may also include a device located internal to a presentation device, such as an electronic white board, which records texts and drawings written thereon. Other such recording sources may include a computerized view graph machine, which projects view graphs stored in computer memory onto a projection screening, and technologies such as electronic white boards that output a digital stroke list, resulting in higher visual quality and lower processing and storage requirements than a video recording of a conventional white board. As shown in FIG. 2, each of the recording sources 201-1 through 201-N transmits its record or track to the preprocessor 300, which synchronizes the individual records in time and processes the tracks for storage at the event mass storage 390 and for review by users at a later time.

Figure 3A:
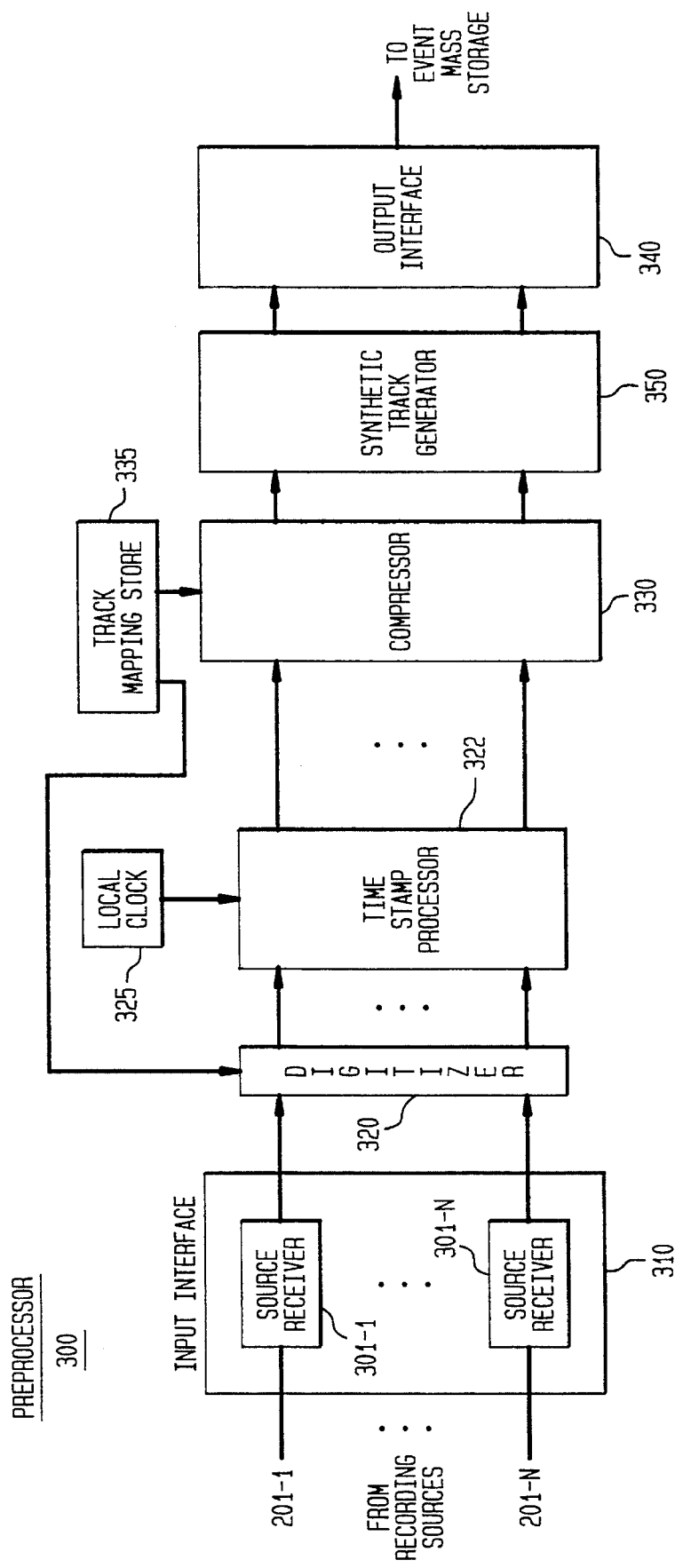
FIG. 3A depicts a preprocessor unit in accordance with an aspect of our invention.

The preprocessor 300, as shown in FIG. 3A, includes an input interface 310, a digitizer 320, a time stamp processor 322, local clock 325, compressor 330, a track mapping table store 335, a derivative track or continuous temporal record generator 350, and output interface 340. Input interface 310 includes source receivers 301-1 through 301-N which receive tracks from recording sources 201-1 through 201-N, respectively. As illustratively shown in FIG. 3B, the track mapping table held at store 335 includes instructions for digitizing, compressing, decompressing, and generating derivative tracks for each track of a multimedia event. This table describes specific instructions relating to the recording and play back of a training session, discussed infra.

The preprocessor 300 also includes a digitizer 320, which codes tracks into digitized blocks. The technique employed for each track is dictated by the recording source generating the track as indicated at the track mapping table store 335. Some tracks may have been outputted from the recording sources in digitized block form. Thus, the signals are passed through digitizer 320 unchanged. The preprocessor 300 also includes a time stamp processor 322, which assigns a relative time to each digitized block of each track. The time assigned to each block is relative to the initiation of the multimedia event. Illustratively, we assume that the multimedia event begins at relative time, $t_R=0$.

The same relative time is assigned to each digitized block of each track simultaneously received at the time stamp processor 322 such that the tracks generated from the recording sources are synchronized in time. Local clock 325 maintains the relative time for a multimedia event and is re-set to $t_r=0$ upon a new multimedia event being received for recording. The time stamp processor 322 of the synchronization processor 300 retrieves the relative time from local clock 325 for synchronizing the tracks. The time stamp processor 322 appends the relative time information to each digitized block in the block header.

Another component of the preprocessor 300 is the compressor 330, which receives tracks from the time stamp processor and compresses each individual track according to a technique indicated in the track mapping table store 335. As indicated in the track mapping table shown in FIG. 3B, the compression technique is dependent upon the type of information (e.g., audio, text, and video) being captured by the recording source. By compressing each track using a compression technique most suitable for the type of information contained in the track, the bandwidth required for transmitting a multimedia event to a user is reduced. Furthermore, a track containing information that remains essentially unchanged over a period of time (e.g., video tracks of view graphs and slides) may be compressed without a significant loss in content or quality of the information. The track mapping table may indicate that a track should not be compressed, in which case the track is passed through the compressor 330 unchanged.

The preprocessor 300 also includes a derivative track or record generator 350 which processes tracks received from compressor 330 to generate other tracks, which are referred to herein as derivative tracks or derivative records, as distinguished from original tracks or records, and which are digitized and time stamped representations of information transmitted from the recording sources. A derivative track comprises information contained in one or more tracks of a multimedia event, which information has been converted into a form that may be more useful to users in searching and browsing through a multimedia event. As shown in FIG. 3C, the derivative track generator 350 includes a character recognition device 360, a speaker identification device 370, a resolution device 380, and a track distributor 385. The character recognition device 360 extracts strings of characters identified in a track of a multimedia event and generates a derivative track, which can be utilized by the user to locate a point of interest in the multimedia event based on strings of characters. Illustratively, a track of a multimedia event which represents a video recording of view graphs shown on a projection screen could be processed at the character recognition device 360 to generate a derivative track of strings of characters identified in the text of the view graphs. Additionally, the character recognition device 350 could extract titles of view graphs from an original track and generate a derivative track comprising an index of view graph titles corresponding to the original track.

The derivative record or track generator 350 also includes a speaker identification device 370 which processes tracks of a multimedia event containing voices of different speakers and generates derivative tracks which represent changes in speakers' voice patterns during the multimedia event. Illustratively, if a user desires to advance in the multimedia event to a point where a trainee interrupts a lecturer with a question, the user could benefit from a derivative track generated by the speaker identification device 370 since this track allows the user to rapidly identify points in the multimedia event where there is a change in speaker voice patterns. The derivative track generator 350 may also include a resolution device 380 which alters the resolution of an original track to generate a derivative track comprising a representation of the original track having a higher or lower resolution. Other processing devices may be implemented at the derivative track generator for processing original tracks to generate derivative tracks. Such other devices could generate derivative tracks which represent an original track at different frame rates or which provide speaker face recognition information derived from an original track. The blocks of the derivative tracks also contain relative time information, which is carried over from the blocks of the underlying original track during processing.

The derivative track generator 350 transfers the original and derivative records or tracks of the multimedia event to the output interface 340, which transfers the tracks to the event mass storage 390 where multiple multimedia events are stored for delivery to requesting users. A copy of the track mapping table corresponding to the multimedia event is also stored at the event mass storage 390. FIG. 4 depicts the layout of multimedia events in storage 390 and illustrates that each track of a multimedia event is separately maintained.

Figure 5:
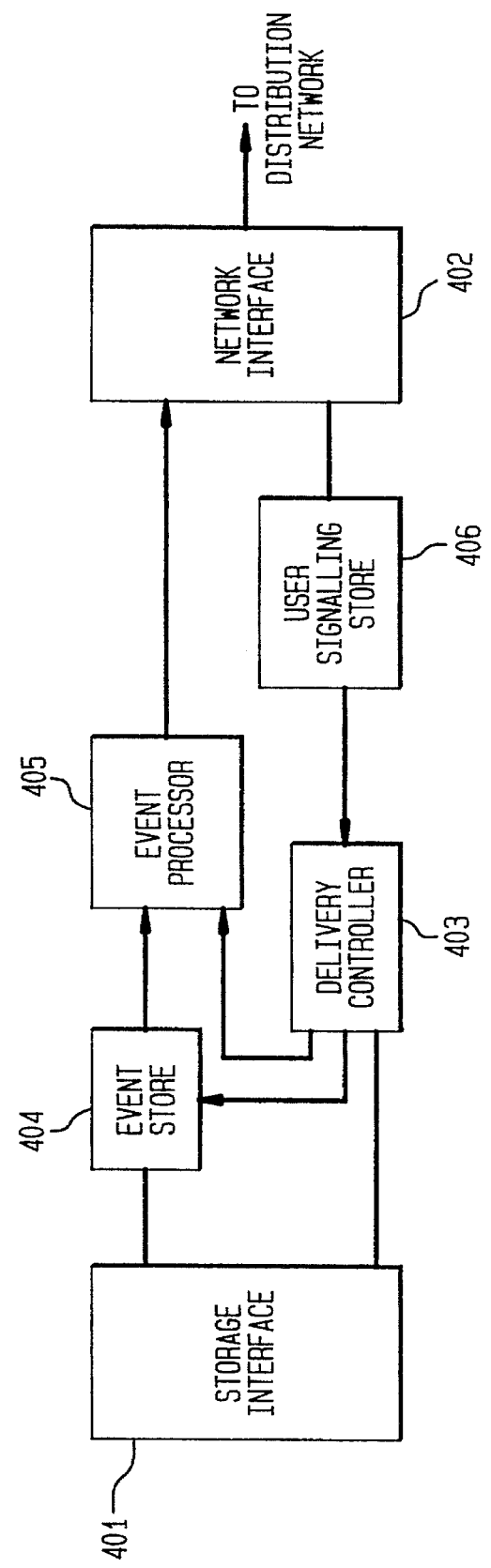
FIG. 5 shows a delivery processor for playing back multimedia events in accordance with an aspect of our invention.

Another component of our inventive system is a delivery processor 400, which, on receiving a request from a user, delivers the requested multimedia event to the user according to interactive commands issued by the user. An illustrative embodiment of our delivery processor 400 is shown in FIG. 5 and comprises an interface 401 to the event mass storage 390 and an interface 402 to user control units 500-1 through 500-M via distribution network 450. The delivery processor further includes an event store 404, where multimedia events are stored once retrieved from mass storage 390, and a user signalling store 406 for holding interactive signalling received from the user control units 500.

Another element of the delivery processor 400 is a delivery controller 403 which causes the event, including the records and the record mapping table, to be retrieved from mass storage 390 into the event store 404 via interface 401. The delivery controller 403 also controls the records or tracks of the multimedia event transferred from event store 404 to event processor 405 for delivery to the user. The event processor 405 is also controlled by the delivery controller 403. The event processor 405 processes, in real time, the individual tracks of the multimedia event, in response to the user's interactive command for a stacked representation of a video track to facilitate rapid and intelligent searching through the track. The output of the event processor 405 is delivered to the user control unit of the requesting user via interface 402.

The control of the event store 404 and the event processor 405 by the delivery controller 403 may be based on the user's interactive commands and also upon other information, such as the capabilities of the user's output devices and the bandwidth constraints of the distribution network 450 interconnecting the delivery processor 400 and the user control unit. Such capabilities and constraints may be stored in a user profile that is accessible by the delivery controller for each user serviced by the delivery controller or may be sent to the delivery controller by the user at the time a request for a multimedia event is made.

A key function of the event processor 405 is to generate a stacked representation of an original or derivative record or track, in real time, to assist the user in searching through a track of a multimedia event to locate a point of interest. A stacked representation is constructed by stacking individual frames of a track of a multimedia event on top of one another, with each frame slightly offset from the previous (see FIG. 7D, discussed infra). The patterns along the top and side of the streamer may provide visual cues. The frames of the stacked representation also contain relative time information. The relative time associated with each is determined by the earliest relative time associated with any block of the track comprising the frame.

On receiving an interactive command from a user requesting a stacked representation of a track, the delivery controller 403 causes the track to be transmitted from event store 404 to the event processor 405, and the event processor to generate the stacked representation. The stacked representation could appear at the user's monitor as an overlay of the track from which the stacked representation is generated or as a separate window. Once the stacked representation appears on the user's monitor, the user can manipulate a pointer along the stacked representation by interacting with the user input devices connected to the user control unit. By moving the pointer along the representation, individual frames of a track can be displayed allowing the user to rapidly browse from frame to frame.

The stacked representation of a track does not have to be constructed from full video frames. For example, prior to creating the stacked representation, the event processor 405 could crop the frames of the track such that changes in the information contained in the track can be readily observable at the top and side edges of the frames. For example, in a track displaying trainees seated in a room, the frames of the track could be cropped by cutting off the upper part of each frame just above the top of the heads of trainees seated in the room, such that, if a trainee stood up or raised her hand to ask a question, this change would be easy to spot by looking at the pattern in the top of the stacked representation.

Another function of the event processor 405 is to generate signalling messages to be presented to users in overlay fashion to acknowledge the users' requests or commands to provide status information or to present stacked representations. Such messages are generated by the event processor on instructions by the delivery controller and are transmitted to the user control unit 500.

The delivery processor 400 and the user control units 500-1 through 500-M are interconnected by a distribution network 450, which comprises transmission equipment and transmission links of fiber optic, coaxial, or copper cable or other suitable transmission medium. Specifically, the distribution network could be the distribution portion of a public switched telephony network (PSTN), which employs Integrated Services Digital Network (ISDN) technology operating at a basic rate of 128 Kb/s or asymmetrical digital subscriber line (ADSL) technology, which provides transport at approximately 1.5 Mb/s downstream and a few kilobits/second upstream overlaid on a telephony channel. Alternatively, the distribution network 450 could also include a local area network.

Figure 6:
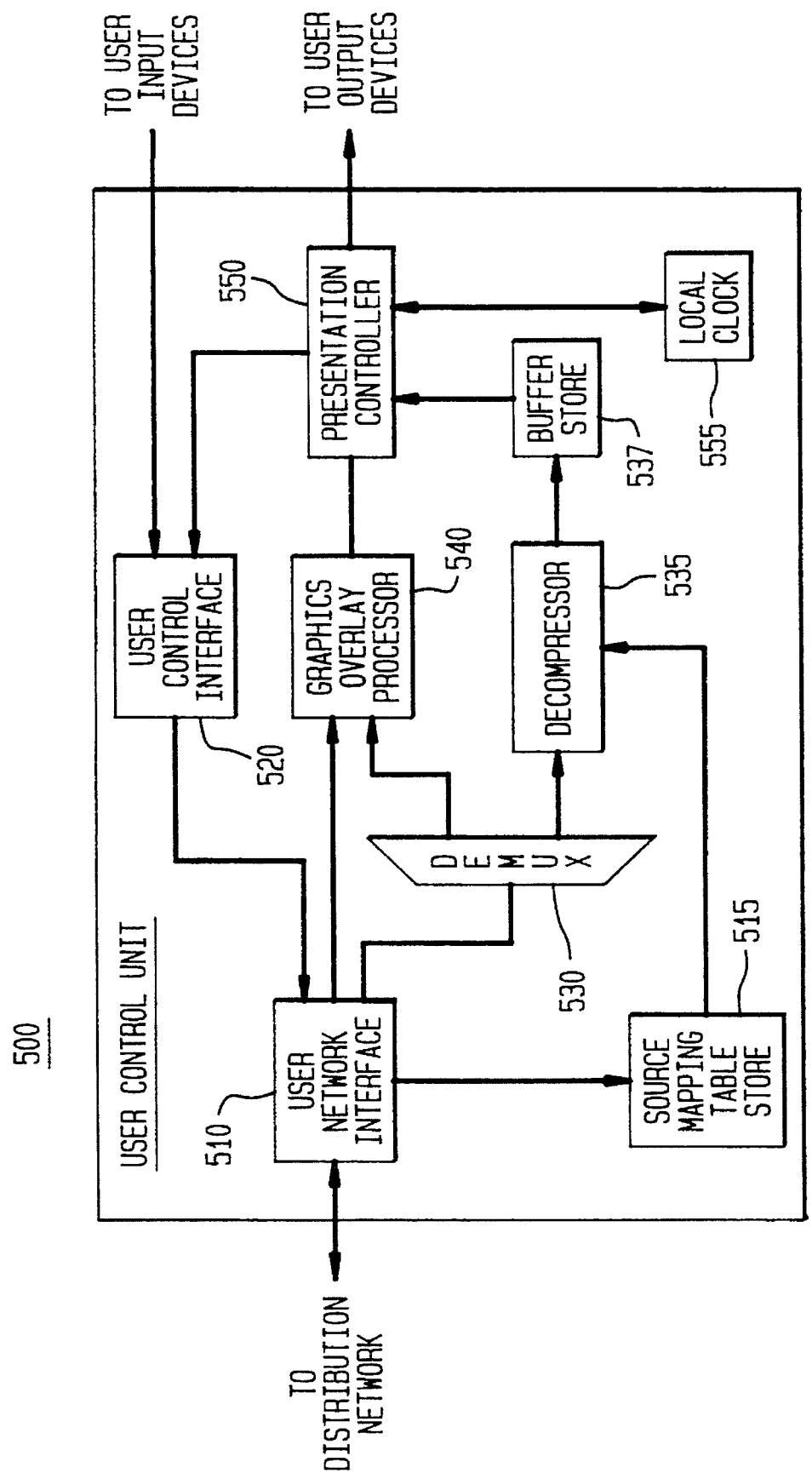
FIG. 6 depicts a user control unit in accordance with an aspect of our invention.

An illustrative embodiment of a user control unit 500 is shown in FIG. 6. On the user side, the user control unit is connected to user output devices such as a computer monitor or a display screen, on which tracks of the multimedia event containing textual and video information are displayed, or an audio system, at which tracks containing audio information are presented. The user control unit 500 is also connected to user input devices, at which user requests for multimedia events and interactive commands are inputted. The user input devices could include a computer keyboard, a computer mouse, or a combination thereof. On the network side, each user control unit 500 is connected to the delivery processor 400 via the distribution network 450.

As shown in FIG. 6, the user control unit is comprised of a user network interface (UNI) 510, a track mapping table store 515, a user control interface (UCI) 520, a demultiplexer 530, a decompressor 535, buffer store 537, a presentation controller 550, a graphic overlay processor 540, and a local clock 555. The user input devices are connected to the UCI 520, and on receiving a request for an event or an interactive command being input by the user, the UCI 520 generates signalling to the UNI 510, which forwards the user's requests and commands to the delivery processor 400 to be serviced. By manipulating the user input devices, the user can select one or more of the original or derivative tracks of a multimedia event for presentation at the user output devices and control the presentation of the tracks to the user output devices using traditional VCR-type commands and other play back features. Also, the user can search through individual tracks of the multimedia events to locate a point of interest in the multimedia event and request stacked representations of different tracks.

The UNI 510 receives signalling from the UCI 520 representing the user's requests and interactive commands and forwards this signalling to the delivery processor 400. The UNI 510 also receives the track mapping table and the tracks of the multimedia event from the delivery processor 400 to be presented at the user output devices. The track mapping table is transferred by the UNI into store 515. Upon receiving the tracks of the multimedia event, the UNI passes the tracks to the demultiplexer 530, at which the tracks are separated and each track is outputted from a distinct channel of the demultiplexer 530 and transferred to the decompressor 535. At the decompressor 535, each track is decompressed according to information contained in the track mapping table, which information is retrieved by the decompressor from the store 515. As described above, this table assigns a compression and decompression technique for tracks of the multimedia event. In the case where the track is not to be decompressed, the track passes through the compressor unchanged.

Tracks outputted from the decompressor 535 are transferred to a buffer store 537, where the tracks are held for presentation to the user. Tracks of a multimedia event to be presented at the user output devices in overlay fashion are received from decompressor 535 at the graphics overlay processor 540. The presentation controller 550 retrieves the blocks of each track from the buffer store 537 and the graphics overlay processor 540, and presents blocks of each track to the user output devices when the relative time associated with each block matches the the relative time indicated at the local clock 555, thereby permitting the blocks of each track to be presented in a synchronized manner. The presentation controller also resets the relative time at the local clock 555 according to adjustments made by the user in the current position in the multimedia event.

Optionally, the user control unit 500 may include a graphics overlay processor 540 which receives signalling information from the delivery processor via the UNI 510. This signalling information controls the overlay of text and graphics on to the tracks of the multimedia events, which text and graphics are presented to the user output devices by the presentation controller 550.

Figure 7B:
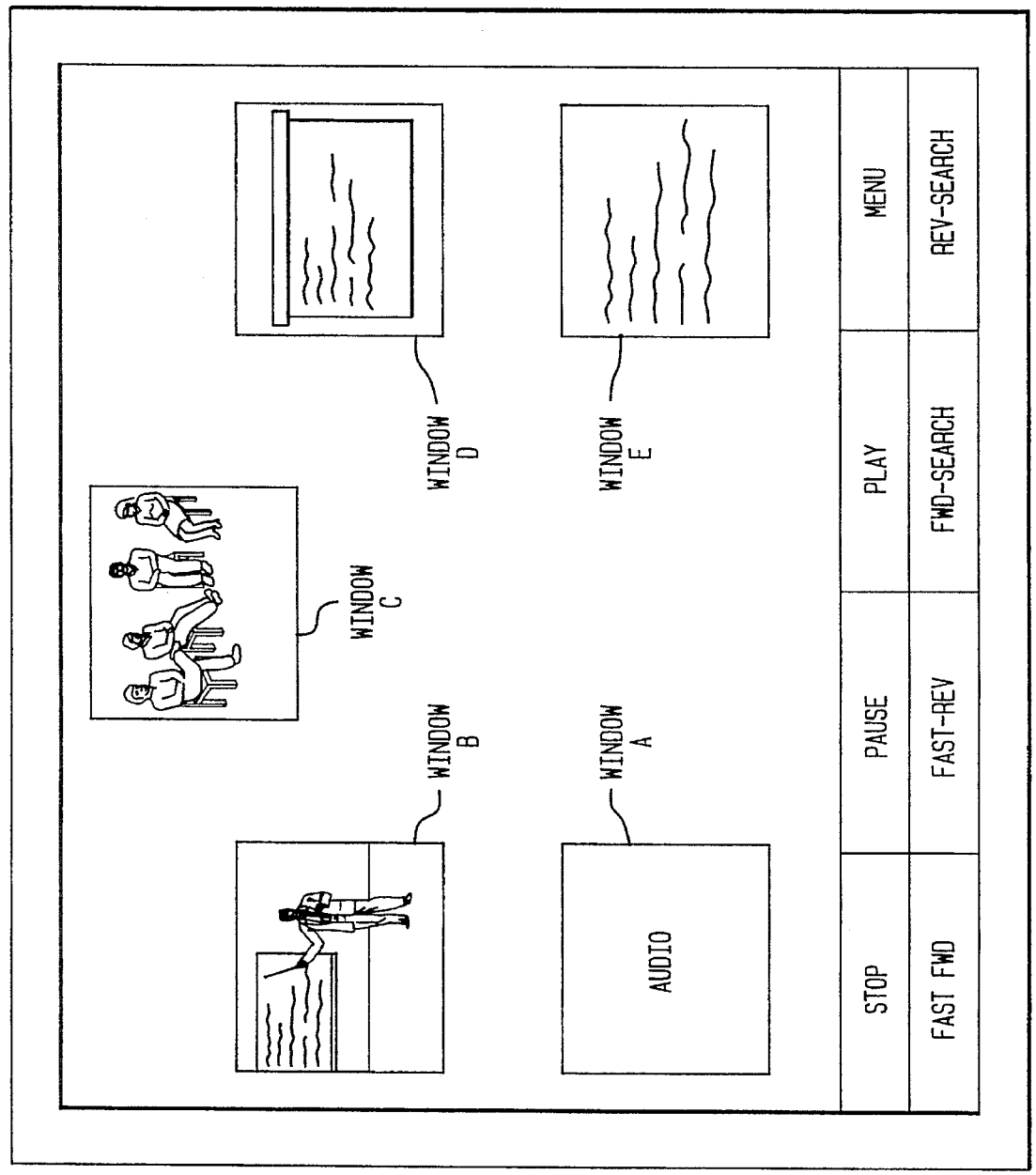
FIG. 7B depicts the user's view of the training session, as displayed on the user's monitor, in this embodiment of our invention.

For purposes of illustrating the operation of our recording and play back system and method, consider the multimedia event shown in FIG. 7a, which depicts a training room, wherein a training session is being conducted by lecturer 110 and attended by trainees 111–114. Different aspects of the training session are captured and recorded by our inventive recording and play back system. During the training session, the lecturer presents lecture materials by speaking, writing on the white board, displaying view graphs, and answering questions asked by the trainees. FIG. 7A depicts a training session being captured using the recording sources of our inventive system, and FIGS. 8A, 8B, and 8C show an illustrative flow diagram of our recording and play back method.

Figure 8A:
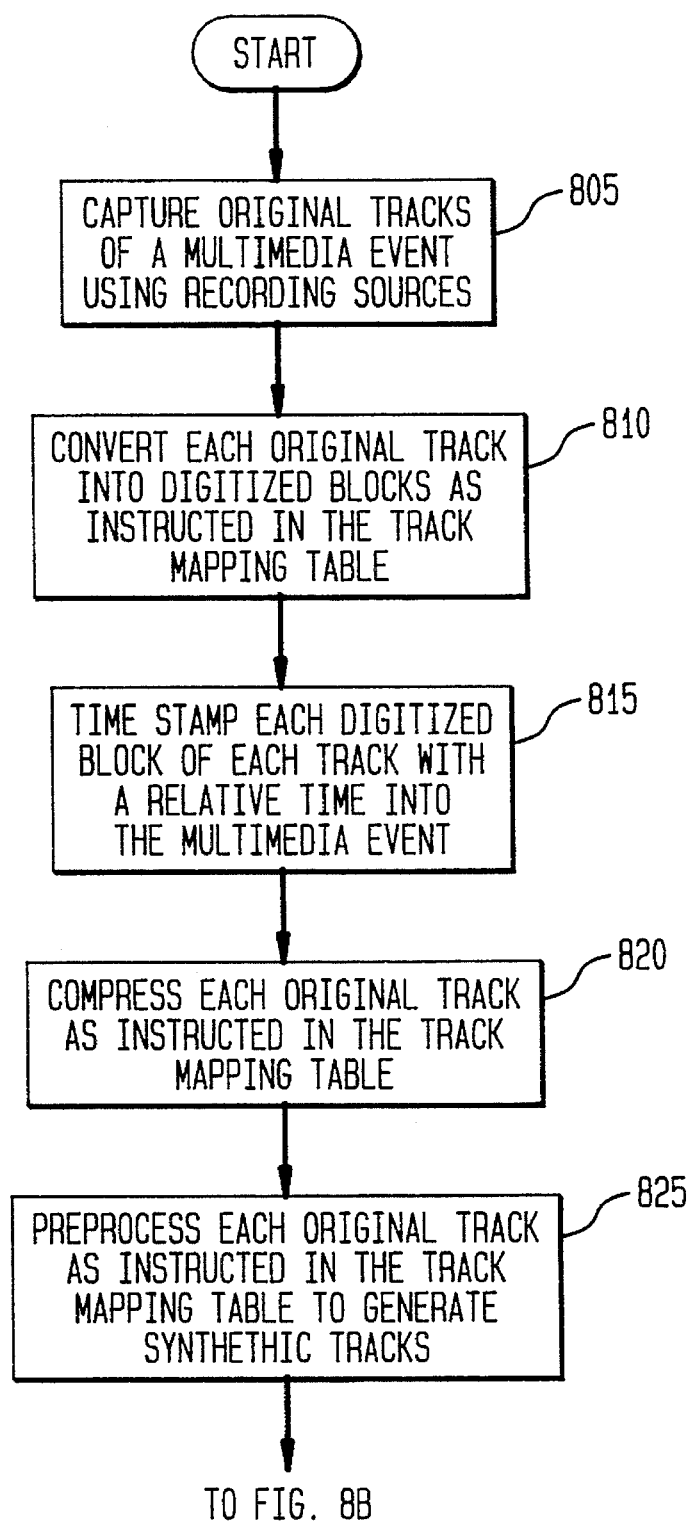
Figure 8C:
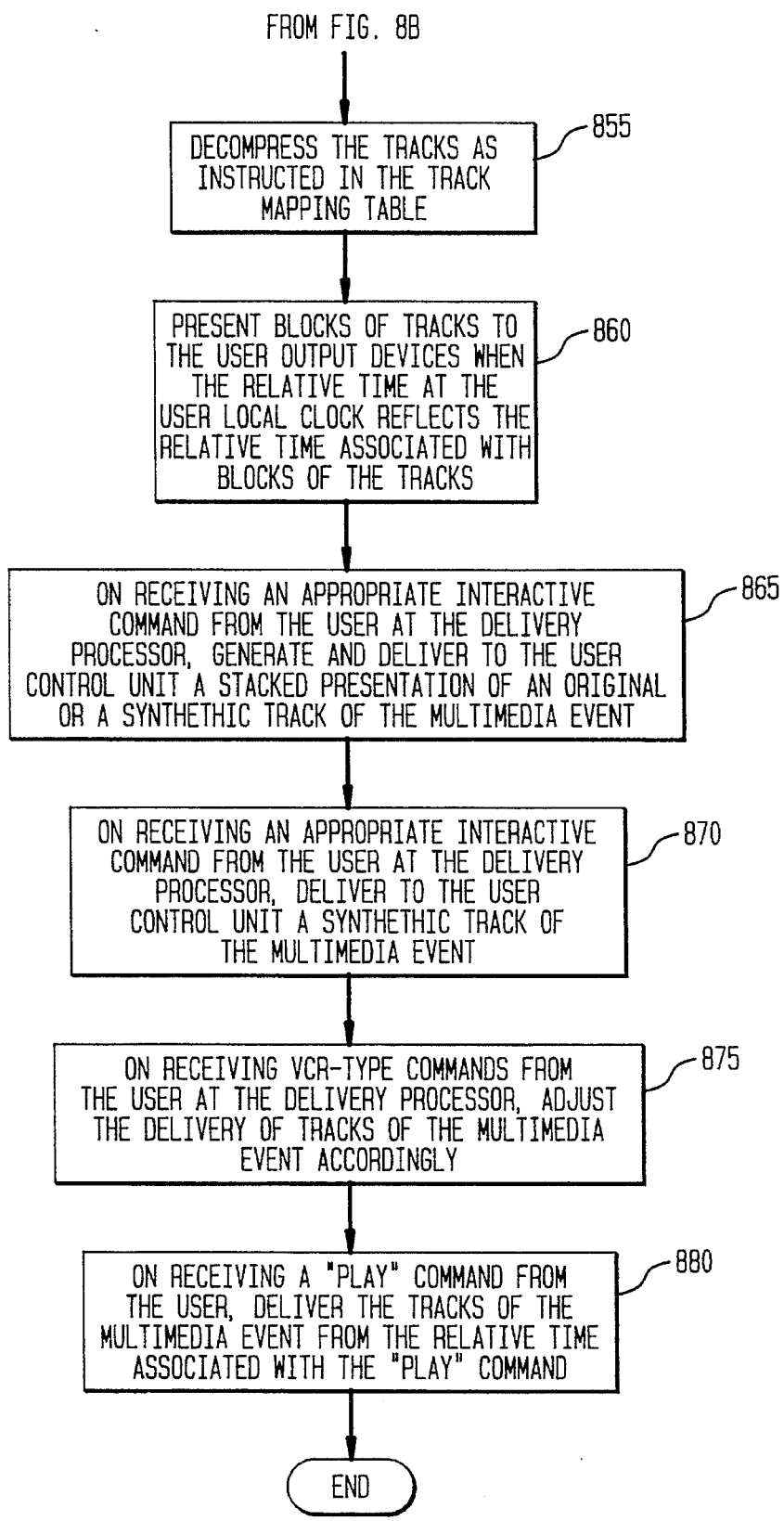

Recording sources 127, 601, 602, and 603 comprise the recording sources 201 of FIG. 2 and are located throughout the training room to capture a complete recording of all aspects of the multimedia event (Step 805 of FIG. 8A). As shown in FIGS. 7A, the recording sources include a first camera 601 which may be mounted in the room ceiling and pointed at the lecturer to capture in full motion video a view of the lecturer 110 during his presentation at the training session; a second camera 602 which may also be mounted in the ceiling and is pointed similarly to capture a view of trainees 111 through 114, and a third ceiling mounted camera 603, which captures a view of the projection screen 125 where view graphs are presented to the trainees. Other recording sources include an audio capturing system comprising a lavaliere microphone 604, which is worn by the lecturer and captures the audio of the lecturer's presentation, and a ceiling microphone 605, which captures audio from within the training room, such as questions from the trainees. Lastly, white board 127 is a recording source which captures texts and drawings written thereon. The audio capturing system also includes a mixer (not shown) which combines the audio from the lavaliere and ceiling microphones, and the combined audio is treated as one track of the multimedia event. For illustrative purposes, we assume that all recording sources generate an analog continuous temporal record or track, except the electronic white board 127, which captures strokes written thereon in the form of digitized blocks. The track or record mapping table held at store 335 for the training session is shown in FIG. 3B. This table includes the digitization, compression/decompression, and preprocessing instructions for each track of the training session.

Each of the recording sources transmits its captured track to the input interface 310 of the preprocessor 300 where each track is received by a source receiver. The track captured by the audio capturing system is received at source receiver 301-1. Video tracks captured by the first, second, and third cameras 601 through 603 are each received at a source receiver 201 and the track from the electronic white board 127 is also received at a source receiver 301. The tracks received at the source receivers are transmitted to the digitizer 320, where each track is transformed into digitized blocks according to instructions contained in the track mapping table 335 (Step 810). The track received from the white board is already in digitized block form, and therefore, this track requires no digitization as indicated in the track mapping table. The digitized blocks are then transferred to the time stamp processor 322 where each block of each track is time stamped with a relative time retrieved from local clock 325 (Step 815). Specifically, each digitized block of each track received simultaneously at the frame synchronization processor 320 is time stamped with the same relative time, which is retrieved from local clock 325. The time stamped, digitized blocks representing a track received at each source receiver comprise original tracks 1 through 5 of the multimedia event.

The original tracks of the multimedia event are then transmitted to the compressor 330 where each track is compressed according to the technique specified in the track mapping table held at store 335, as shown in FIG. 3B (Step 820). As specified in the table, track 1, comprising the combined audio detected from the audio capturing system, is compressed using an Adaptive Differential Pulse Coded Modulation (ADPCM) technique with a 4 to 1 compression ratio. Original tracks 2 and 3, comprising video of the lecturer and trainees, respectively, are compressed using the Motion Picture Expert Group (MPEG) technique with a 100 to 1 compression ratio. Original track 4, comprising video of the view graphs, is compressed using the Motion Joint Photographic Expert Group (M-JPEG) technique with a 5 to 1 compression ratio. As indicated in the track mapping table, track 5 comprising the contents of the white board remains uncompressed.

After compression, the original tracks are transferred to the derivative track generator 350 where the original tracks are preprocessed according to instructions contained in the track mapping table to generate derivative tracks of the multimedia event (Step 825). As indicated in the track mapping table, track 1 is preprocessed at the speaker identification device 370 to generate derivative continuous temporal record or track 6 which includes a bar graph representing changes in speaker voice patterns during the training session. Original tracks 2 and 3 are preprocessed at the resolution device 380 to generate derivative tracks 7 and 8, which each represent a high resolution version of the video information of tracks 2 and 3, respectively. Original track 4 is preprocessed at the character recognition device 360 to generate derivative track 9 comprising an index of titles of the view graphs captured in original track 4. As indicated in track mapping table 335, original track 5 comprising the contents of the white board is also preprocessed at the character recognition device 360 to generate derivative track 10, comprising strings of characters from original track 5. The track mapping table and the original and derivative tracks of the training session are transferred by the derivative track generator 350 to the event mass storage 390 (Step 830 of FIG. 8B).

Now, we assume that a user 501-1 served from user control unit 500-1 wishes to review the training session and that the user has user input devices and output devices integrated in a computer system (not shown). A mouse and a keyboard of the computer system serve as user input devices and the monitor and audio presentation system serve as user output devices. The user places a request for the training session by interacting with the keyboard, and the user's request is transferred by the user control unit 500-1 to the delivery processor 400, via the distribution network 450. At the delivery processor 400, the request is held at the user signalling store 406, and on detecting the signalling, the delivery controller 403 responds by retrieving the training session, comprising tracks 1 through 10 and the track mapping store, from the event mass storage 390 and causes the session to be stored in event store 404 (Step 835). Based upon additional information contained in the user's request or in the user's profile at the delivery processor 400, the delivery controller 403 determines that all original tracks 1 through 5 should be delivered to the user and causes these tracks to be transferred to the event processor 405 for delivery to the user (Step 840). The delivery controller also causes the track mapping table to be transferred to the event processor 405, which forwards the table to the user control unit 500-1 (Step 840). The table is received at the UNI 510 and held at store 515.

Once the training session has been retrieved and is ready for delivery and the track mapping table has been delivered to the user control unit 500-1, the delivery controller 403 instructs the event processor 405 to send to the user control unit 500-1 a "READY" signal, indicating that the delivery processor 400 is ready to deliver the requested multimedia event. On receiving the "READY" signal, the UNI 510 of the user control unit, FIG. 6, transfers the signal to the graphics overlay processor 540 which causes a "READY" message to be displayed on the user's monitor.

On receiving a "PLAY" command from the user, the delivery controller 403 commences the delivery of the training session by instructing the event processor 405 to deliver original tracks 1 through 5 to the user control unit 500-1 (Step 845). At the user control unit, FIG. 6, the original tracks 1 through 5 are demultiplexed into separate channels (Step 850) and decompressed as instructed in the track mapping table held at store 515 (Step 855 of FIG. 8C). The decompressed tracks are then transferred to the presentation controller 550, which controls the presentation of the tracks to the user's computer system. Specifically, the presentation controller 550 transmits blocks of each track to the computer in a synchronized manner by utilizing relative time information contained in each block of each track (Step 860). The presentation controller 550 of the user control unit 500-1 thus controls the presentation of blocks of each individual tracks based upon the relative time at the local clock 555. Therefore, all tracks are presented in a synchronized manner since the blocks of each track representing concurrent aspects of the training session are time stamped with the same relative time.

FIG. 7B depicts the user's view of the training session as displayed on the user's monitor. As shown, each track of the training session appears in a separate window of the monitor along with interactive commands available to the user. Window A contains track 1. Since track 1 contains audio information only, Window A displays a message to the user in graphical overlay fashion indicating that the track contains non-visual information. Window B displays track 2 comprising video of the lecturer 110, Window C displays track 3 comprising video of the trainees 111–114, Window D displays track 4 comprising video of view graphs on the projection screen 125, and Window E displays track 5 comprising information written on the white board 127.

Now, we assume that the user at control unit 500-1 desires to locate a specific point of interest in the training session.

Specifically, the user desires to see the facial expression of trainee 114 on hearing the lecturer's response to a question from trainee 113. Under conventional recording and play back systems, the lecturer 110 has limited options in searching through the training session to locate this point of interest. These options include using VCR-type commands to advance or reverse through the session captured by a conventional system. However, such conventional options do not permit a user to rapidly and intelligently search for a particular point of interest based upon details known to the user.

Under our inventive recording and play back system, the user has multiple options for rapidly and intelligently searching through the training session to locate the point of interest described above, which options include searching through any or all original tracks of the training session, derivative tracks generated from original tracks of the training session, and stacked representations of original or derivative tracks. The option selected by the user is dependent upon the knowledge of the user about the point of interest desired. Specifically, if the user recognizes the appearance of trainee 113, the user could search through original track 3 comprising video of the trainees, through track 8, comprising a high resolution version of track 3, or through a stacked representation of tracks 3 or 8. If the user does not recognize the appearance of trainee 113, but does recognize his voice, the user could search through original track 1, comprising audio of the training session, or a stacked representation of track 1.

Even if the user does not recognize the appearance or voice of trainee 113, the user could still rapidly and intelligently search through derivative record or track 6, comprising a bar graph representing changes in speaker voice patterns. Furthermore, if the user knows that the question from trainee 113 related to a view graph concerning "Video Recording and Play Back Systems", the user could search through original track 4 comprising view graphs of the training session, through derivative track 9 comprising an index of view graph titles from original track 4, or through a stacked representation of tracks 4 or 9, for such a view graph. Similarly, if the user knows that the question from trainee 113 concerning to text written on the white board relating to "Video Recording and Play Back Systems", the user could search through original track 5 comprising strokes written on the white board, through derivative track 10 comprising strings of characters generated from track 5, or through a stacked representation of tracks 5 and 10. Therefore, unlike conventional recording and play back techniques, our system and method give users multiple options for intelligently searching through a multimedia event.

Figure 7C:
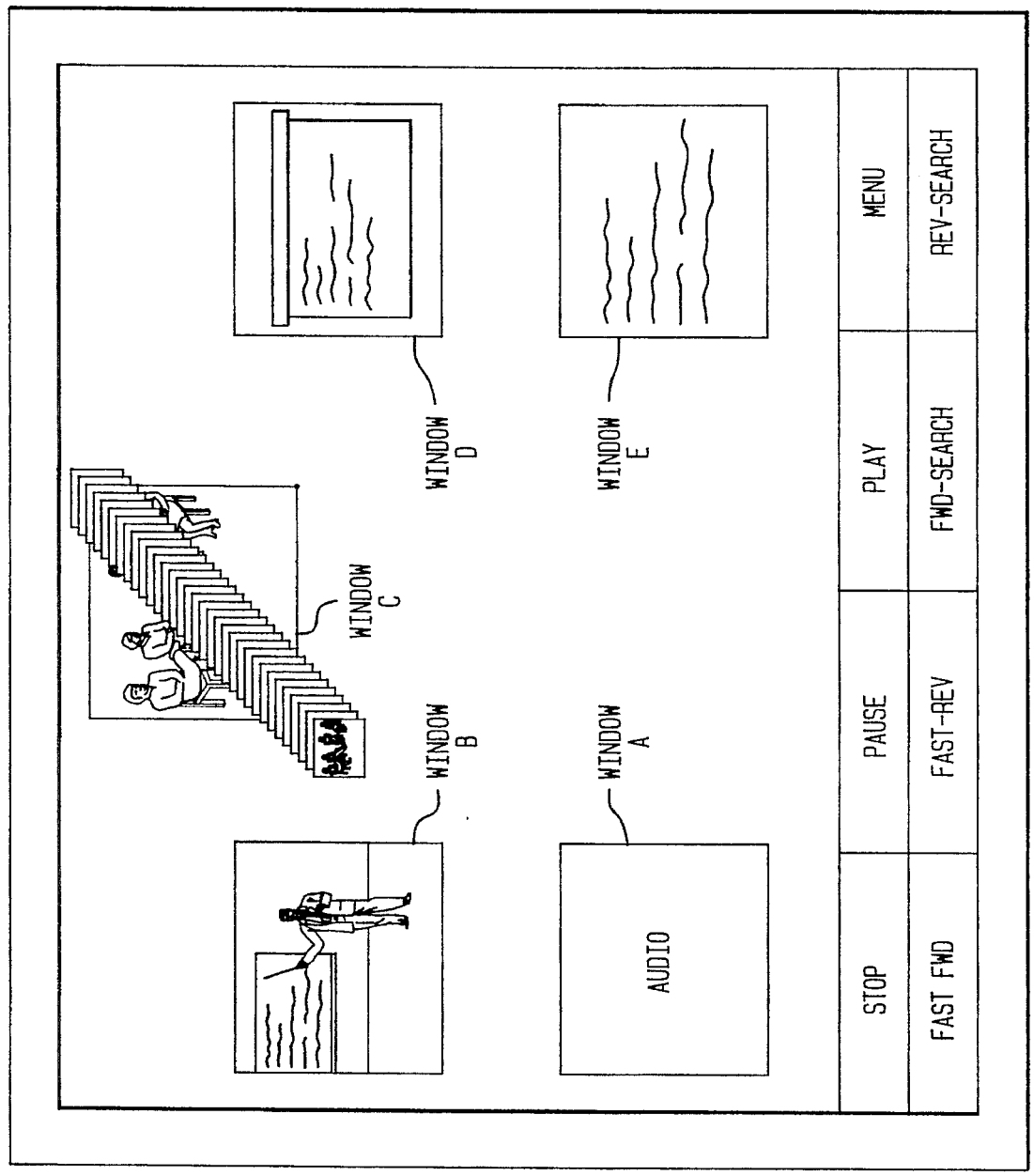
FIG. 7C depicts the user's view of a stacked representation of a track of the training session, as displayed on the user's monitor, in this embodiment of our invention.

To select any of these tracks for searching through the training session, the user manipulates the keyboard or computer mouse. Illustratively, if the user wished to search based upon video of trainees 111–114 (track 3) shown in Window C, the user can manipulate the pointer displayed on the monitor, as shown in FIG. 7B, using the computer mouse to select Window C. Once Window C is selected, the user can access a menu of searching options corresponding to track 3, which options are described above, by selecting the MENU command. First, we assume that the user selects the stacked representation of track 3 extending from the current relative time to the end time of the training session. The user control unit 500-1 detects the user's selection and transmits it to the delivery processor 400. The delivery controller 403 of the delivery processor 400 responds by causing the event processor 405 to deliver all tracks to the user control unit 500-1, generate a stacked representation of track 3 over the relative time period specified, and deliver the stacked representation to the user control unit 500-1 (Step 865 of FIG. 8). The stacked representation is illustratively presented on the user's monitor in overlay fashion over track 3, as shown in FIG. 7C.

By manipulating the pointer along the stacked representation, the user can reverse or advance frame by frame in the training session. Therefore, as the user moves the pointer along the frames of the stacked representation, the frame pointed to appears elevated with respect to the other frames of the stacked representation. On locating a frame in the stacked representation depicting the point of interest for which the user is searching, the user enters the "PLAY" command, which is detected at the UCI 520. The UCI 520 retrieves from the presentation controller 550 the relative time associated with the frame pointed to and transfers the "PLAY" command coupled with this relative time to the delivery processor 400. On receiving the "PLAY" command at the delivery processor 400, the delivery controller 403 causes the event processor 405 to discontinue the delivery of the stacked representation and resume the delivery of all tracks previously being delivered, but from the relative time associated with the "PLAY" command. The delivery controller 403 functions similarly on receiving a "PLAY" command from the user after the user has searched through any of the tracks or stacked representations using VCR-type commands. Specifically, the delivery controller 403 causes the the event processor 405 to resume delivery of all tracks previously being delivered, but from the relative time associated with the "PLAY" command.

Figure 7D:
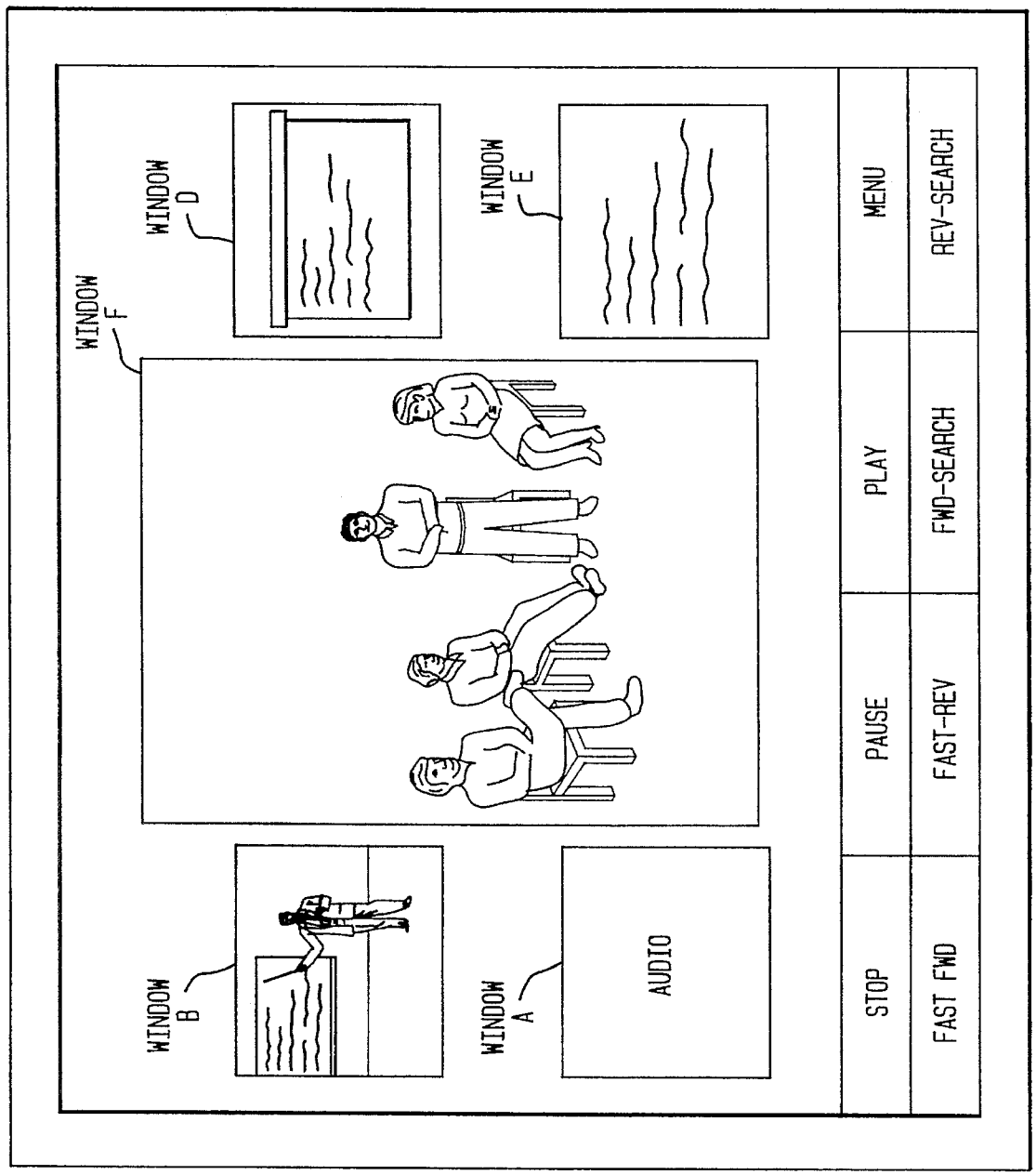
FIG. 7D depicts the user's view of a high resolution version of a track of the training session, as displayed on the user's monitor, in this embodiment of our invention.

The user could also have selected from the menu of options associated with track 3 the high resolution version (track 8). On receiving the user's selection of this menu option at the delivery processor 400, the delivery controller 403 causes the event store 404 to transfer track 8 to the event processor 405. The delivery controller 403 then causes the event processor 405 to discontinue delivery of track 3 and then commence delivery of track 8 to the user control unit 500-1 (Step 870). As shown in FIG. 7D, track 8 is displayed on the user's monitor in a new, larger Window F. By viewing the high resolution version of track 3 (track 8) in Window F, the user has a better view of the trainees and can read the expression on the face of trainee 114 as he listens to the lecturer's answer to the question posed by trainee 113.

The user may also implement VCR-type commands on each of the tracks displayed on the user's monitor. As shown in FIGS. 7A, 7B, 7C, and 7D, these VCR-type commands include stop (STOP), pause (PAUSE), fast rewind (FAST-REW), fast forward (FAST-FWD), forward search (FWD-SEARCH), and reverse search (REV-SEARCH). Any of these commands can be selected by the user from the keyboard or the computer mouse. When the user selects any of these commands, the delivery controller 403 causes the event processor 405 to adjust the delivery of the track selected (Step 875) and to send a message to the user control unit 500-1, which message appears on the user's monitor in overlay fashion, and acknowledges the command selected by the user. If no track is selected when VCR command is selected, all tracks are adjusted according to the command selected by the user.

When the "STOP" command is selected with respect to a window, the delivery controller 403 causes the event processor 405 to discontinue delivery of the track presented in the window. When the "PAUSE" command is selected, the delivery controller 403 causes the event processor 405 to continually re-deliver the current frame of each track being delivered. Audio tracks being delivered are temporarily discontinued. Selection of the "FAST REW" and "FAST-FWD" commands causes the delivery of the tracks presented in the window selected to be rapidly reversed or advanced, respectively. In response to the selection of either of these commands, the delivery controller 403 causes the event processor 405 to halt the delivery of all tracks and send a signal to the user control unit 500-1 of a viewing position indicator (e.g., horizontal bar graph) which reflects the change in position in the training session. Upon reaching the desired new position in the training session, the user enters the "PLAY" command. On receiving the "PLAY" command at the delivery processor 400, the delivery controller 403 causes the event processor 405 to resume delivery of all tracks previously being delivered, but at the relative time associated with the new position in the training session (Step 880).

On the user's selection of the "REV-SEARCH" and "FWD-SEARCH" commands, the delivery controller 403 causes the event processor 405 to deliver blocks comprising frames from multiple groups of frames in a track to be delivered to the user control unit 500-1 in the reverse or forward direction, respectively. Delivery of these frames creates the perception that the track is being presented at a rate faster than real time. However, in fact the transmission rate from the delivery processor 400 to the user control unit 500-1 does not change, but only frames from groups of frames in the track are being delivered.

CONCLUSION

Our system and method for recording and playing back multimedia events entail capturing multimedia continuous temporal records or tracks representing various aspects of a multimedia event, coding the tracks into digitized blocks, and time stamping each block such that the tracks of the multimedia event are synchronized in time. The tracks are also compressed and preprocessed as instructed in a track mapping table. The tracks of the multimedia event are transmitted to the user as requested, and the delivery of the tracks is adjusted based upon relative time information associated with a new position established when searching through in the multimedia event. Finally, the above-described embodiments of the invention are intended to be illustrative only. Numerous alternative embodiments of the present invention may be devised without departure from the spirit and scope of the following claims.

What is claimed is:

1. A system for recording and playing back to users a plurality of different aspects including visual, audible, graphic, or textual presentations of a multimedia event, each captured by a distinct one of a plurality of recording sources, to facilitate the indexing capability of users, wherein each of said captured aspects forms a distinct original continuous media temporal record of said multimedia event, said system comprising:

a preprocessor for processing each said original record, said preprocessor including
a digitizer for transforming each said original record into digitized blocks, and
means for generating derivative records, said means comprising a time stamp processor for time stamping each of said digitized blocks of each said original record with the relative time for said multimedia event and a derivative continuous temporal record generator for processing said original records to generate derivative records which contain arrangements of information in said original records to assist users in searching through said multimedia event;
a delivery processor for delivering to said users both said derivative records processed at said preprocessor and each said original record and for adjusting delivery of said original records of said multimedia event based on interactive commands received from users;
user control units for receiving said original and derivative records of said multimedia event from said delivery processors and transmitting to said delivery processor users' requests for said multimedia event and users' interactive commands for playing back said multimedia event, wherein each of said user control units includes a user local clock for tracking a relative time for said requested multimedia event and each said user control presents each said block of each said original and derivative record when said relative time of each said block matches said relative time at said user local clock; and
output devices for displaying derivative records to enable identification of the occurrence of events in one or more of said original records.

2. The recording and play back system of claim 1, wherein said preprocessor further comprises a compressor, connected to said time stamp processor, for compressing said records of said multimedia event, said derivative record generator being connected to said compressor.

3. The recording and playback system of claim 1, wherein said preprocessor further comprises an input interface, connected to the recording sources, said input interface including source receivers for receiving said original records from the recording sources.

4. The recording and play back system of claim 1, wherein said preprocessor further comprises a store for holding a record mapping table which includes instructions for digitizing, compressing, and processing said original records of said multimedia event.

5. The recording and play back system of claim 3, wherein said preprocessor further comprises a local clock, connected to said time stamp processor, for keeping time for said multimedia event.

6. The recording and play back system of claim 1, wherein said derivative record generator of said preprocessor comprises a character recognition device, for generating said derivative records by identifying and extracting strings of characters from said original records of said multimedia event, said derivative records being utilized by users to locate points of interest in said multimedia event based on said identified strings of characters.

7. The recording and play back system of claim 6, wherein said derivative record generator of said preprocessor also comprises a speaker identification device for generating further derivative records by detecting and extracting voice patterns from said original records, said further derivative records being utilized by users to locate points of interest in said multimedia event based on changes in voice patterns.

8. The recording and play back system of claim 7 wherein said derivative record generator of said preprocessor also includes a resolution device for generating additional derivative records by changing the resolution of said original records.

9. The recording and play back system of claim 4, wherein said derivative record generator of said preprocessor comprises a record distributor for receiving said original records from said compressor and distributing said original records among devices of said derivative record generator based upon said processing instructions at said record mapping table.

10. The recording and play back system of claim 1, further comprising an event mass storage, connected to said preprocessor, for storing said multimedia event from said preprocessor, and wherein said delivery processor further comprises a delivery controller, which, on receiving a request from a user for said multimedia event, causes said original and said derivative records and said record mapping table of said multimedia event to be retrieved from said event mass storage and stored at said delivery processor and identifies records of said multimedia event to be delivered to said requesting user.

11. The recording and play back system of claim 10, wherein said delivery processor, on receiving an interactive command from said user control unit of said requesting user for one of said derivative records, causes said event processor to deliver blocks of said one derivative record to said user control unit of said requesting user, said blocks of said derivative record being synchronized in time with respect to other records being delivered to said user control unit of said requesting user.

12. A system for recording and playing back to users a plurality of different aspects including visual, audible, graphic, and textual presentations of a multimedia event to facilitate indexing by a user, said system comprising:

means for receiving from multiple input devices different original continuous media temporal records, each comprising a different representation of the multimedia event;

means for coding said original records in digital blocks;

means for stamping each of said blocks with the same relative time for the multimedia event;

means for storing a record mapping table;

means responsive to said storing means for compressing information in said original records dependent upon the type of information;

means responsive to said compressing means for converting said information in said original records including said relative time into a plurality of derivative continuous temporal records;

means for displaying said derivative records to enable identification of the occurrence of an event in one or more of said original records; and means responsive to users' requests for receiving and presenting one or more of said original records.

13. The system in accordance with claim 12, further comprising means for generating a stacked representation of one of said derivative records.

14. The system in accordance with claim 13, wherein said means responsive to said users' requests selects one of said original and derivative records, or a stacked representation of one of said derivative records for retrieval and display.

15. A method for recording and playing back a plurality of different aspects including visual, audible, graphic, or textual presentations of a multimedia event to facilitate indexing by a user comprising the steps of:

receiving from multiple input devices different original continuous temporal records, each comprising a different representation of the multimedia event, coding said original records into digital blocks, time stamping each of said blocks with the same relative time for said multimedia event, converting information in said original records including the relative time into a plurality of derivative continuous temporal records, retrieving and displaying said derivative records responsive to a user's request as an index to locate a particular portion of one of said original records, and responsive to the display of said derivative records to enable the display of said original records.

16. A method in accordance with claim 15, further comprising the step of compressing information in said original records in accordance with the type of information in said original records.

17. A method in accordance with claim 15, further comprising the step of generating a stacked representation of one of said original and derivative records.

18. A method in accordance with claim 17, wherein said retrieving and display step further comprises the step of selecting one of said derivative records or a stacked representation of one of said derivative records.

19. A system for recording and playing back a plurality of different aspects including visual, audible, graphic, or textual presentations of a multimedia event, said system comprising:

a preprocessor including input interface means for receiving different original continuous media temporal records each comprising a different representation of the multimedia event, means for digitizing and time stamping blocks of information for each said original record with the same relative time, means for compressing said information in said original records in accordance with the type of information in said records, and means for converting said information in said original records into different forms in derivative temporal records including the stamped relative times;

a mass storage element for receiving outputs from said preprocessor;

a delivery processor including an event store for receiving outputs from said mass storage element, an event processor for generating stacked representations of said derivative records in said event store, and delivery control means responsive to inputs from a user for selectively causing said information of said original and said derivative records and stacked representations of said information of said derivative records to be transmitted for display; and display means for displaying said derivative records as an index to locate a particular occurrence on one or more of said original records.

20. The system in accordance with claim 19, further comprising a user control unit for receiving inputs from the user and for receiving from said delivery processor the information to be displayed, said control unit including network interface means for receiving said information to be displayed, a demultiplexer connected to said network interface means, a decompressor connected to said demultiplexer, and means responsive to said decompressor for presenting said information to be displayed to the user.

21. The system in accordance with claim 20, wherein said preprocessor further comprises means for storing a record mapping table, said means for compressing being responsive to said record mapping table, and wherein said user control unit further comprises means for storing said record mapping table, said decompressor being responsive to said record mapping table.

22. The system in accordance with claim 20,
wherein said means for digitizing and time stamping stamps blocks of information with a relative time for the multimedia event, and
wherein said user control unit includes clock means for indicating said relative time and said means for presenting said information compares the relative time from said clock means to said relative time on said blocks of information from said decompressor.

* * * * *